United States Patent [19]

Yoshikawa et al.

[11] 4,067,032
[45] Jan. 3, 1978

[54] STRUCTURE OF CAMERA BODY

[75] Inventors: Ryoichi Yoshikawa, Kawasaki; Teruhisa Oda, Sagamihara; Kunio Tanaka, Yokohama; Yukio Iura, Yokosuka; Tadahide Fukushima, Tokyo; Hiroshi Aizawa, Machida, all of Japan

[73] Assignee: Canon Kabushiki Kaisha, Tokyo, Japan

[21] Appl. No.: 591,324

[22] Filed: June 30, 1975

[30] Foreign Application Priority Data

July 5, 1974 Japan .................................. 49-77158

[51] Int. Cl.² ............................................ G03B 17/00
[52] U.S. Cl. ..................................... 354/288; 354/219
[58] Field of Search ............... 354/288, 199, 200, 219; 352/242

[56] References Cited

U.S. PATENT DOCUMENTS

| | | | |
|---|---|---|---|
| 1,883,512 | 10/1932 | Bornmann | 354/288 |
| 2,043,926 | 6/1936 | Fuerst | 354/288 |
| 2,320,423 | 6/1943 | Githens et al. | 354/288 |
| 2,417,240 | 3/1947 | Crumrine | 354/288 |
| 2,936,685 | 5/1960 | O'Brien et al. | 354/288 |

*Primary Examiner*—L. T. Hix
*Assistant Examiner*—Alan Mathews
*Attorney, Agent, or Firm*—Toren, McGeady and Stanger

[57] ABSTRACT

A camera body is molded out of plastic, and a metal block is incorporated into the camera body as it is molded. The metal block has an aperture for determining the size of picture and a rail face for guiding the film. Mounted on the camera body, which is capable of being equipped with the film feeding mechanism, is a front plate unit presenting a mounting seat for the reflex mirror. The front plate is mounted directly on the metal block.

3 Claims, 3 Drawing Figures

STRUCTURE OF CAMERA BODY

BACKGROUND OF THE INVENTION

1. Field of the Invention

The present invention relates to an improvement in the structure of a camera body suited for a single reflex camera.

2. Description of the Prior Art

Usually the body of a single reflex camera is made of castings of light metals, such as aluminum for reasons of strength and precision. However, in order to manufacture such camera bodies much time and labor are needed because many manufacturing processes have to be performed, accordingly camera bodies are necessarily very expensive. Quite recently, on the other hand, the concept of a lightweight single reflex camera has been greatly desired, whereby the camera body forming the heaviest part of the single reflex camera is formed of metal as mentioned above, and, as a result, the weight of the camera body plays the largest part in this problem of providing a lightweight camera. Quite recently, to overcome this problem, forming the camera body out of plastic has been considered, however, because the distance between the rail face for guiding the film and the mount face for mounting the photographic lens, namely the so-called flange back is already fixed, it is often impossible to make the part of plastic, which part affords the aperture for determining the size of the picture and the rail face for guiding the film so that it is thick enough to provide the necessary strength. Thus, various problems occur, such as insufficient strength of the above mentioned aperture and the rail face or insufficient precision of the above mentioned flange back due to deformation by means of the outside temperature.

The first purpose of the present invention is to eliminate the above mentioned shortcoming for enabling the camera body to be formed out of plastic.

The second purpose of the present invention is to simplify the process for manufacturing the camera body.

Further, other purposes will be disclosed from the explanation to be made below in accordance with an embodiment of the present invention.

DESCRIPTION OF THE PREFERRED EMBODIMENT

Figure 1:
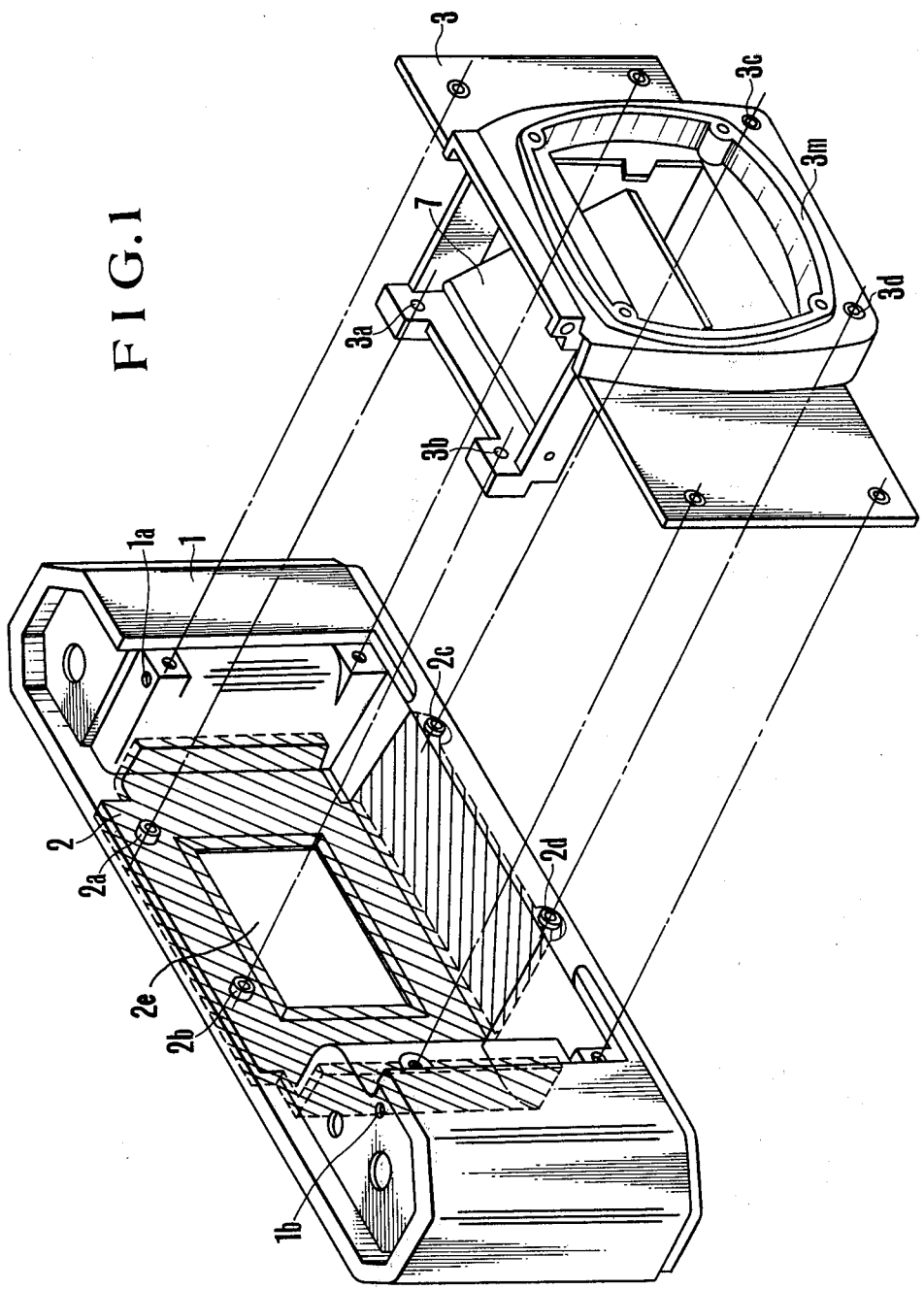
FIG. 1 shows in an exploded perspective an embodiment of the present invention and more particularly it illustrates the camera body in which the metal block has been inserted, and the front plate.

The present invention will be explained in detail below in accordance with the accompanying drawings of an embodiment of the present invention. In FIG. 1, a camera body 1 made of formed plastics includes screw oles 1a and 1b for mounting a shutter unit and a metal block 2 presenting an aperture 2e and rail faces 2f (note FIG. 3) inserted in the camera body 1. Front plate 3 is equipped with a reflex mirror 7, made of a metallic material and presenting a seat 3m equipped with a mount (not shown in the drawing) for mounting a photographic lens. The camera body has a rear wall in which a main section of the metal block is inserted. The main section includes the aperture 2e and the rail faces 2f. Extending from the rear wall of the camera body toward the front plate 3 are a pair of side walls and a bottom wall which terminate in a front wall. The front wall has an opening into which the front plate 3 fits. The metal block 2 has a first bent section inserted into the bottom wall of the camera body and extending toward the front wall. At the front wall of the camera body the first bent section provides a first mounting part consisting of the parts 2c and 2d. Along the edges of the main section extending upwardly from the bottom wall are two second bent sections projecting toward the front wall. A second mounting part consisting of the parts 2a and 2b is located at the upper edge of the main section of the metal block. The front plate includes a third mounting part consisting of parts 3c and 3d and a fourth mounting part consisting of parts 3a and 3b. In this arrangement, the first mounting part having parts 2c and 2d and the second mounting part having parts 2a and 2b of the metal block align, respectively, with the third mounting part having parts 3c and 3d and the fourth mounting part having parts 3a and 3b for engagement with one another by means of from the influence such as deformation of the plastic parts of the camera body due to the variation of the outside temperature.

Figure 2:
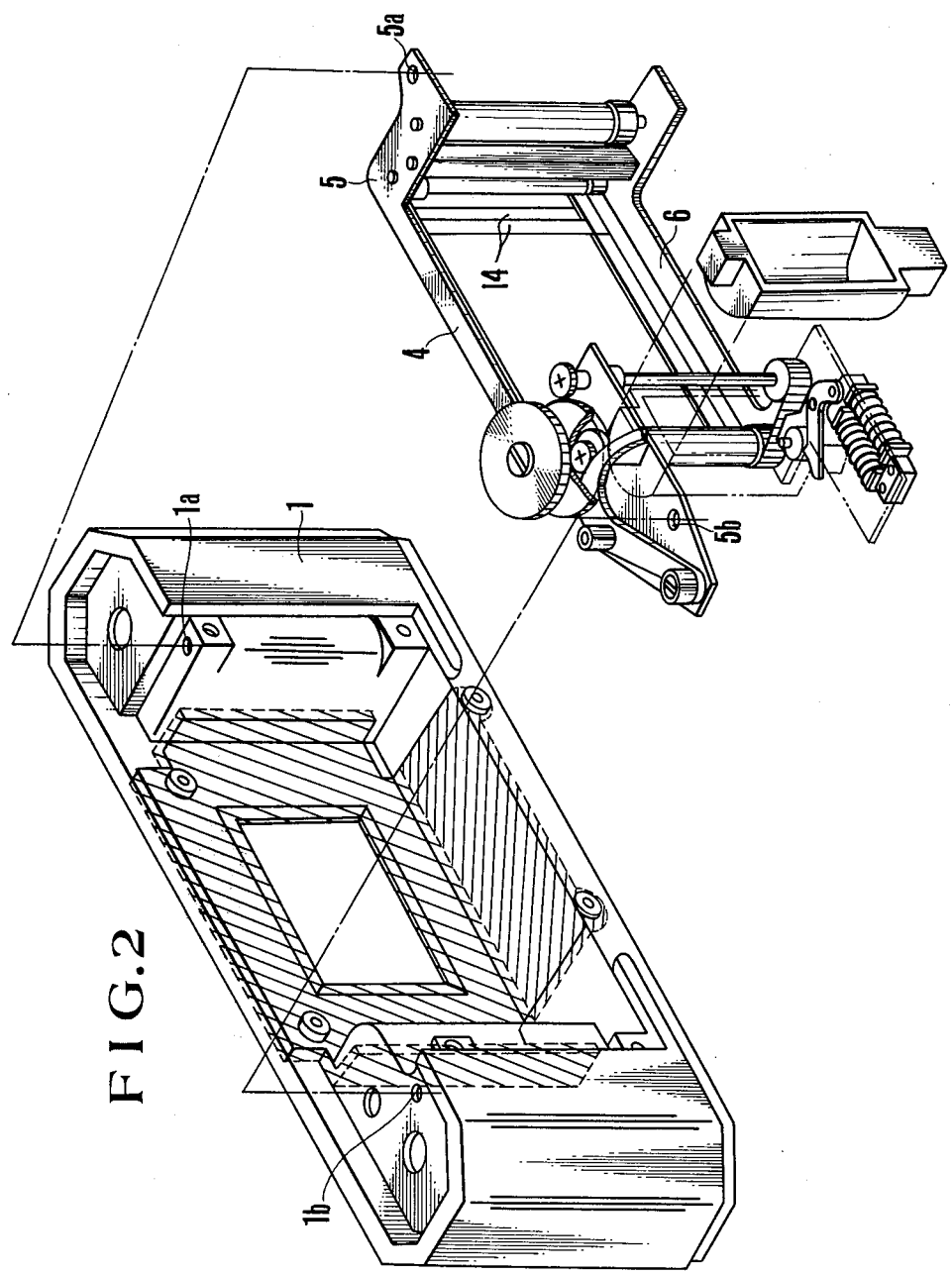
FIG. 2 is an exploded perspective view showing the camera body in which the metal block has been inserted, as illustrated in FIG. 1, and a shutter unit.

In FIG. 2, a focal plane shutter unit 4 is illustrated including an upper base plate 5 and a lower base plate 6, with engaging holes 5a, 5b in the upper plate, which align with the screw holes 1a and 1b for connecting the camera body and the shutter unit by means of screws, not shown, so that the focal plane shutter unit 4 is mounted on the camera body 1. The shutter unit 4 includes a shutter diaphragm 14.

Figure 3:
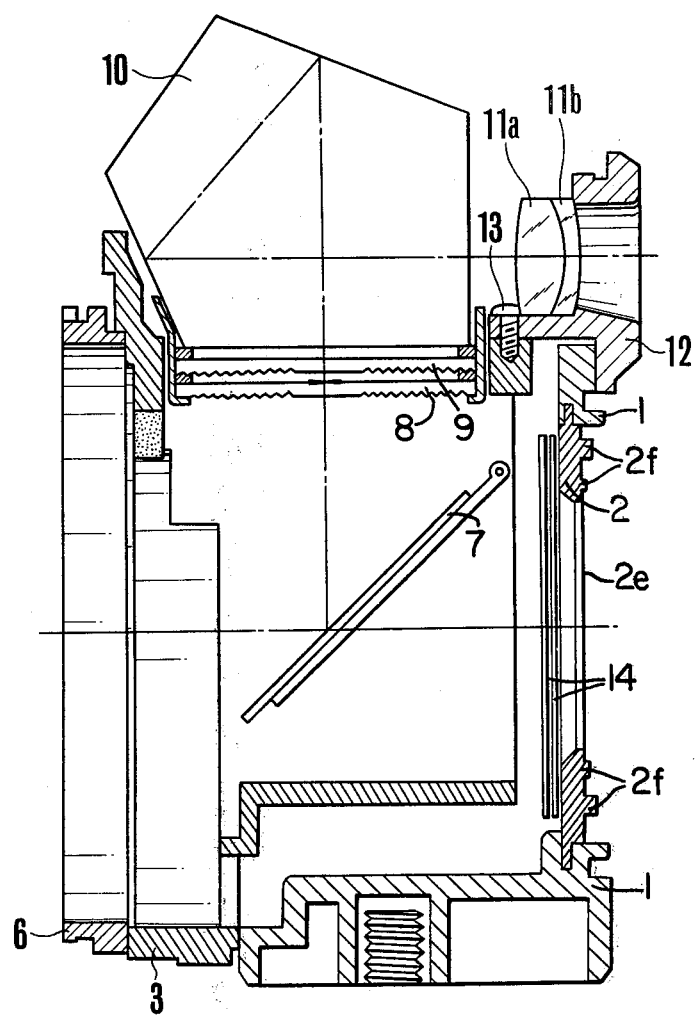
FIG. 3 is a lengthwise sectional view of the front plate shown in FIG. 1 and equipped with all of the view finder optics and also illustrating the camera body and the metal block.

FIG. 3 shows in lengthwise section the front plate 3 shown illustrated in FIG. 1 and equipped with all of the view finder optics, including a mount 6, a reflex mirror 7, a focus plate 8 presenting a Fresnel plane, a Fresnel lens 9, a pentagonal roof prism 10, eye pieces 11a and 11b, an eye piece holder 12 and a screw 13 for mounting the eye piece holder 12 on the front plate 3. Further, FIG. 3 displays the arrangement of the front plate 3 relative to the camera body 1 and the metal block 2.

Below the process for manufacturing such a camera as described above, will be explained. At first the metal block 2 is put in a form for forming the camera body and the melted plastic is injected into the form after the form has been closed. After having been cooled the camera body 1, in which the metal block 2 has been inserted is removed after the form has been opened. Then the camera body 1 is equipped with the shutter unit 4, which is fixed on the camera body 1 by means of screws. Next the front plate 3 on which the view finder optics have been mounted, is fixed on the camera body and the metal block 2 inserted in the camera body, by means of screws in such a manner that most of the process for the parts in need of precision is finished.

As mentioned above, in accordance with the present invention, the camera body 1 is formed of plastic while the aperture 2e and the rail faces 2f for guiding film are formed in the metal block to provide sufficient strength for the aperture and the rail face for guiding film, which strength can not be obtained with plastic and to prevent the deformation of these parts due to the variation of the outside temperature, whereby the metal block is inserted into the camera body in such a manner that the precision of the flange bag is secured by connecting the inserted metal block with the front plate. Further, by mounting the shutter, which is made as one unit, on the camera body, the influence of the possible deformation of the camera body on the precision of the shutter is made as small as possible while by mounting the view finder optics on the front plate, made of metal material in order to obtain the necessary precision, all of the influence of the possible deformation of the plastic camera body upon the part in need of precision can be avoided. Because it is made possible to form the camera body out of plastic the manufacturing process has been simplified in such a manner that not only the manufacturing cost is cut down but also a camera light in weight is produced, which is very profitable.

What is claimed is:

1. A single lens reflex camera body comprising a molded plastic camera body including a rear wall, a front wall, and a bottom wall and side walls extending between said rear and front walls, a metal block inserted in said molded plastic camera body during the molding thereof, said metal block comprising a main section, a first section extending angularly from said main section and a pair of spaced second bent sections extending angularly from said main section, said first bent section being inserted in the bottom wall of said camera body and having a first mounting part provided on the edge of said first bent section spaced from said main section, said main section being inserted in said rear wall of said camera body and having a second mounting part adjacent the edge thereof spaced from said first and second bent sections, said main section having an aperture therethrough for determining the size of pictures and also having rail faces thereon for guiding film, a front plate unit made of a metallic material and having a photographic lens mounting seat and a mirror mounting parts, the front plate unit having a third mounting part located at the side of said mounting seat and aligned with said first mounting part and also having a fourth mounting part located at the mirror mounting part and aligned with said second mounting part, and connecting means for securing said front plate unit directly to said metal block inserted in said molded plastic camera body, said connecting means connecting said first mounting part to said third mounting part and said second mounting part to said fourth mounting part for ensuring the precision and strength of the camera body.

2. A camera body, as set forth in claim 1, wherein said front plate unit having a view finder unit mounting seat therein, a view finder unit mounted on said view finder unit mounting seat.

3. A camera body, as set forth in claim 1, including a shutter unit mounted on said camera body and inserted between said camera body and said front plate unit.

* * * * *